(12) United States Patent
Camp (10) Patent No.: US 9,982,660 B2
(45) Date of Patent: May 29, 2018

(54) LIFTING SYSTEM AND METHOD FOR AN INCLINED PLANE

(71) Applicant: Billy D. Camp, Leander, TX (US)

(72) Inventor: Billy D. Camp, Leander, TX (US)

( * ) Notice: Subject to any disclaimer, the term of this patent is extended or adjusted under 35 U.S.C. 154(b) by 91 days.

(21) Appl. No.: 15/188,925

(22) Filed: Jun. 21, 2016

(65) Prior Publication Data
US 2016/0377063 A1 Dec. 29, 2016

Related U.S. Application Data

(60) Provisional application No. 62/185,351, filed on Jun. 26, 2015.

(51) Int. Cl.
*F03G 3/00* (2006.01)

(52) U.S. Cl.
CPC ............ *F03G 3/00* (2013.01); *F03G 2730/07* (2013.01)

(58) Field of Classification Search
CPC .................................... F03G 3/00; F03G 7/10
See application file for complete search history.

(56) References Cited

U.S. PATENT DOCUMENTS

| 2009/0309373 A1* | 12/2009 | O'Briant | F03B 17/04 290/1 R |
| 2012/0013131 A1* | 1/2012 | Yeh | F03G 7/10 290/1 D |

* cited by examiner

*Primary Examiner* — Phillip A Johnson
(74) *Attorney, Agent, or Firm* — Pierson IP, PLLC (57) ABSTRACT

Embodiments disclosed herein describe systems and methods for efficiently and effectively raising a carriage to create potential energy, and converting the potential energy into electric energy. In embodiments, the carriage may be raised utilizing multiple fulcrums, wherein the fulcrums are positioned off center from a first linear axis of the carriage. In embodiments, the fulcrums may be positioned equidistance from a second linear axis of the carriage.

10 Claims, 12 Drawing Sheets

LIFTING SYSTEM AND METHOD FOR AN INCLINED PLANE

CROSS-REFERENCE TO RELATED APPLICATIONS

This application claims a benefit of priority under 35 U.S.C. § 119 to Provisional Application No. 62/185,351 filed on Jun. 26, 2015, which is fully incorporated herein by reference in its entirety. This application is related to U.S. patent application Ser. No. 14/339,878, which is fully incorporated herein by reference in its entirety.

BACKGROUND INFORMATION

Field of the Disclosure

Examples of the present disclosure are related to systems and methods that effectively and efficiently raise an object to a desired height on an inclined plane. More specifically, as the embodiments describe systems and methods for utilizing off-center fulcrums on a carriage to move the carriage up an incline plane.

Background

Potential energy is the energy of an object or a system due to the position of the object relative to a surface. Gravitational energy is the potential energy associated with gravitational force, where potential gravitational energy is obtained by elevating the object against Earth's gravity away from a surface of the earth. Factors that affect an object's potential gravitational energy include: the object's height respective to a reference point or Earth's surface, the object's weight, and the strength of the gravitation field it the object is in. Responsive to the object descending from a raised height towards the Earth's surface, gravity accelerates the mass of the object, and the potential energy is converted into kinetic energy. The kinetic energy may then be used to perform work or generate electricity by an electric generator.

In certain parts of the world, alternative energy sources such as gravity, solar, wind, and fossil fuels may be the only viable source of energy to individuals. However, the costs or creating solar or wind energy generators may be too high to construct. Similarly, purchasing fossil fuels may be too expensive. Further, solar energy is only available at night if power is stored in a battery, and wind power may only be available during certain parts of a day and/or year.

Other alternative energy sources use the effects of gravity on objects to generate power. However, such alternative energy sources are inefficient due to the loss of energy required to raise an object. Many of these methods fail to take into account the shape of the material being lifted. A mechanical advantage may be realized by utilizing the shape and size of the object being lifted. By taking advantage of this inherent property, greater efficiency, in the lifting of the object, may be realized.

Accordingly, needs exist for systems and methods to lift an object on an inclined plane.

SUMMARY

Embodiments disclosed herein describe systems and methods for efficiently and effectively raising a carriage to create potential energy, and converting the potential energy into electric energy. A carriage may be defined to be a manufactured structure which has been designed to hold, contain and/or give shape to material or materials being so contained and supported. The carriage may be envisioned to be constructed, by those skilled in such arts, to be able to withstand the force of movement and securely maintain the object/objects placed in or up on it. With the understanding that some material may have the properties of a rigid mass, and may be shaped to the desired dimension of a carriage, they also will be considered as being a carriage if their attributes can be made to conform to the properties of a structure manufactured as a carriage. Carriage designs should have the properties mentioned as well as being able to incorporate and/or interface with attached tilting mechanisms and any support structures used for positioning or interacting with it.

In embodiments, the carriage may be raised utilizing multiple fulcrums, wherein the fulcrums are positioned off center from a first linear axis of the carriage. In embodiments, the fulcrums may be positioned equidistance from a second linear axis of the carriage.

In embodiments, applying a force to tilt the carriage may cause the carriage to pivot on the first fulcrum. The carriage may be configured to rotate in a circular motion around the first fulcrum being used as a pivot point. This process may be repeated utilizing the second fulcrum, and rotating the carriage in an opposite circular motion around the second fulcrum being used as the pivot point. By applying force to tilt the carriage and rotating the carriage around different pivot points, the carriage may be raised and moved along an inclined ramp.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The non-limiting embodiments described below are configured to efficiently and effectively raise an object to create potential energy. By controlling the decent of the object kinetic energy may be created. Then the kinetic energy may be converted into electrical energy or mechanical energy. Embodiments may be configured to be utilized at any desired period of the day, which may provide sustainable and readily available electrical energy.

Figure 1:
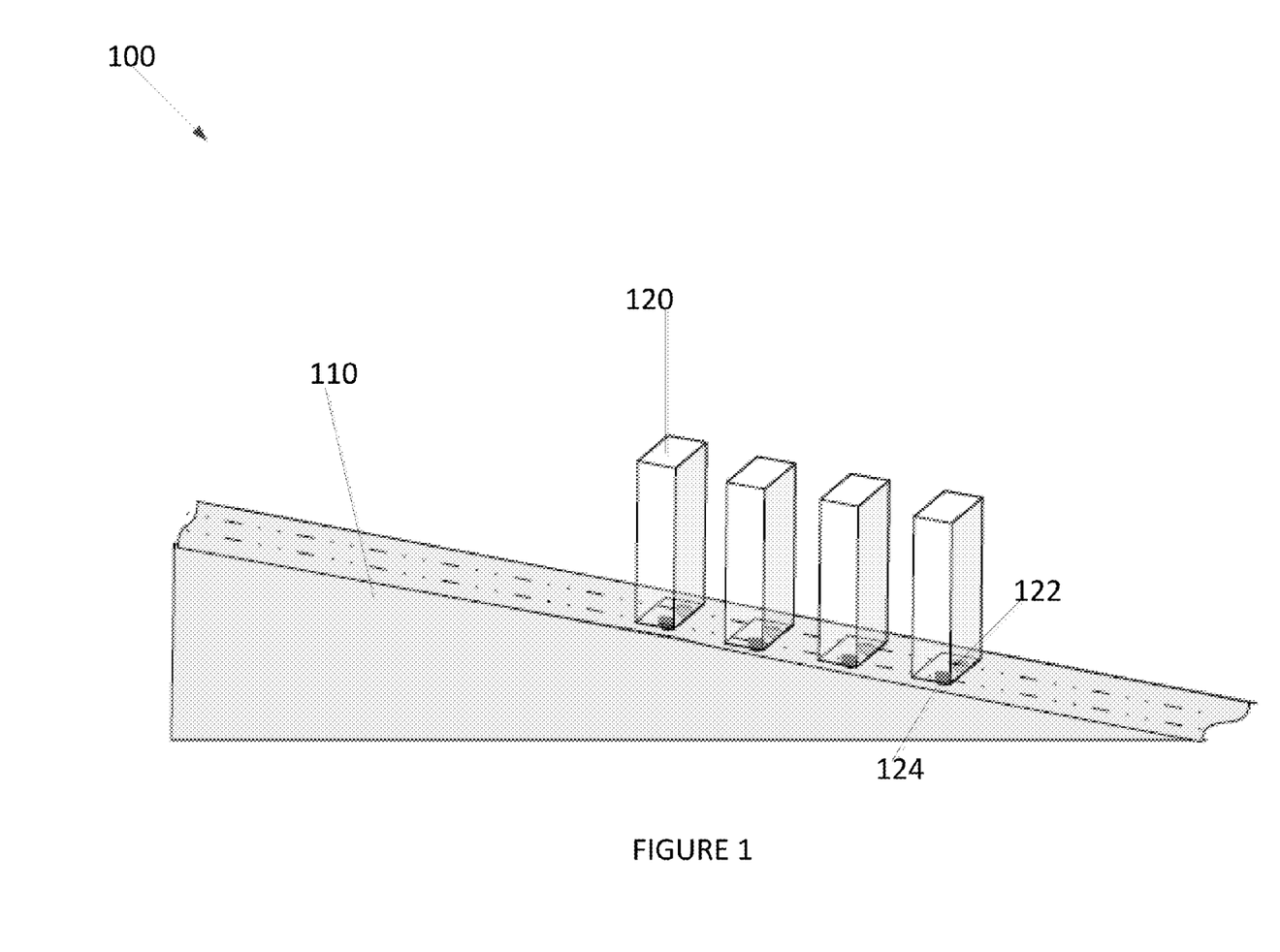
FIG. 1 depicts a lifting system, according to an embodiment.

FIG. 1 depicts a lifting system 100, according to an embodiment. Lifting system 100 may include an inclined ramp 110 and at least one carriage 120.

Inclined ramp 110 may be an inclined plane that has a linear top surface tilted at an angle. Inclined ramp 110 may be used as an aid for raising or lowering carriage 120 between the first end and the second end. Inclined ramp 110 may have a first end positioned at a lower vertical offset than a second end of inclined ramp 110.

Carriage 120 may be substantially square or rectangular or any shape whereby it will provide the applied tilting force the greatest Mechanical Advantage possible when applied to the substantial weight occupying the carriage. Carriage 120 may be configured to move up the inclined ramp 110 from the first end to the second end to increase the potential energy of carriage 120. In embodiments, once potential energy is created by lifting carriage 120, the potential energy may be converted into electric energy by lowering carriage 120. It is understood that the contents of the Carriage may be deposited with or without the carriage at some point along the inclined ramp or at the top of the ramp, thus providing a ready source of potential energy for future use.

Carriage 120 may be configured to move from the first end of inclined ramp 110 to the second end of inclined ramp 110 by utilizing fulcrums 122, 124 that are off center of a central axis of carriage 120. By applying force to tilt carriage 120, carriage 120 will be pivoted on fulcrum 122 or 124 and rotated horizontally in a circular motion up inclined ramp 110. A second force may then be applied to tilt carriage 120 on a second fulcrum. The carriage may then be rotated in a circular motion up inclined ramp 110. Each rotation and pivoting of carriage 120 may incrementally move carriage 120 up inclined ramp 110. By utilizing off-center fulcrums 122, 124, carriage 120 may be moved horizontally and vertically with each tilt. This motion may enable carriage 120 to ascend incline plane 110.

Figure 2:
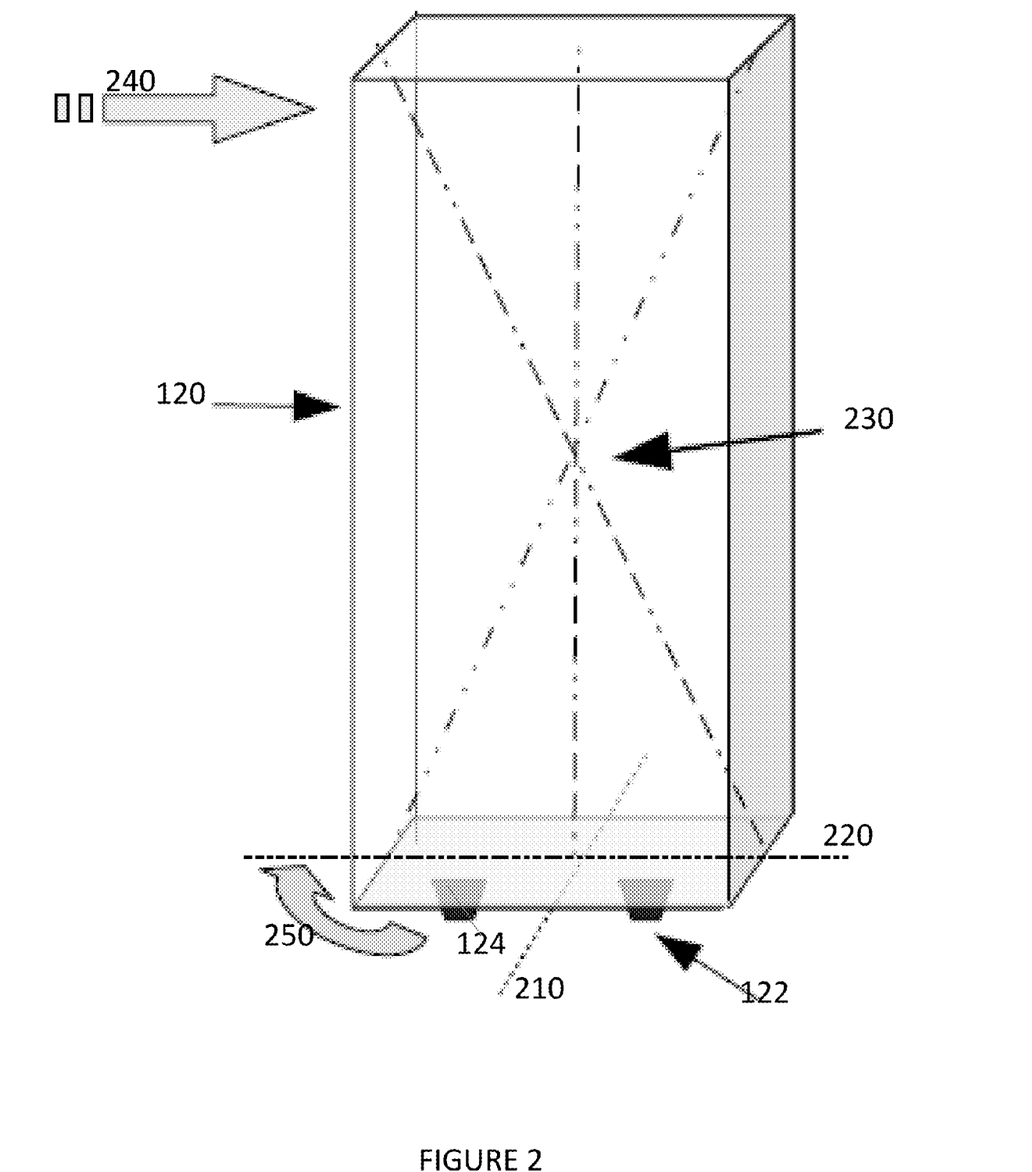
FIG. 2 depicts a carriage, according to an embodiment.

FIG. 2 depicts carriage 120, according to an embodiment. As depicted in FIG. 2, carriage 120 may have a first axis 210 extending across a center of a short axis of carriage 120, a second axis 220 extending across a center of a long axis of carriage 120.

First fulcrum 122 and second fulcrum 124 may be projections extending away from a lower surface of carriage 120. First fulcrum 122 and second fulcrum 124 may be configured to raise a first end of carriage 120 off a supporting surface, while allowing a second end of carriage 120 to be positioned on a supporting surface. First fulcrum 122 and second fulcrum 124 may be positioned between a first end of carriage 120 and second axis 220. Furthermore, first fulcrum 122 and second fulcrum 124 may be positioned on opposite sides of first axis 210. In other words, if a lower surface of carriage 120 was divided into quadrants, first fulcrum 122 may be positioned in the center of a first quadrant, and second fulcrum 124 may be positioned in the center of a second quadrant. The fulcrum position within a quadrant may be based upon calculations involving the angle of tilt and the force and distance of circular rotation required by the unbalanced Carriage.

Due to the positioning of fulcrums 122, 124 a center of gravity 230 of carriage 120 may be positioned more proximate to the second end of carriage 120 than to the first end of carriage 120. By exploiting fulcrums 122, 124 to modify the center of gravity 230 of carriage 120, when carriage 120 is raised up an incline ramp 110, carriage's 120 own shape, size and weight may be utilized to tilt and rotate the carriage 120.

In embodiments, a force 240 may be applied to carriage 120. Responsive to carriage 120 receiving force 240, carriage 120 may pivot around first fulcrum 122, wherein first fulcrum 122 is positioned on an opposite side of carriage 120 that is receiving force 240. Upon receiving the force 240, carriage 120 may rotate in a first circular direction 250. When being rotated, second fulcrum 124 may be raised off the inclined ramp 110 and moved upward along the inclined plane. When tilted, the carriage, being supported by a single offset fulcrum, will naturally rotate forward on the supporting fulcrum due to the imbalance imposed upon it while being tilted.

Figure 3:
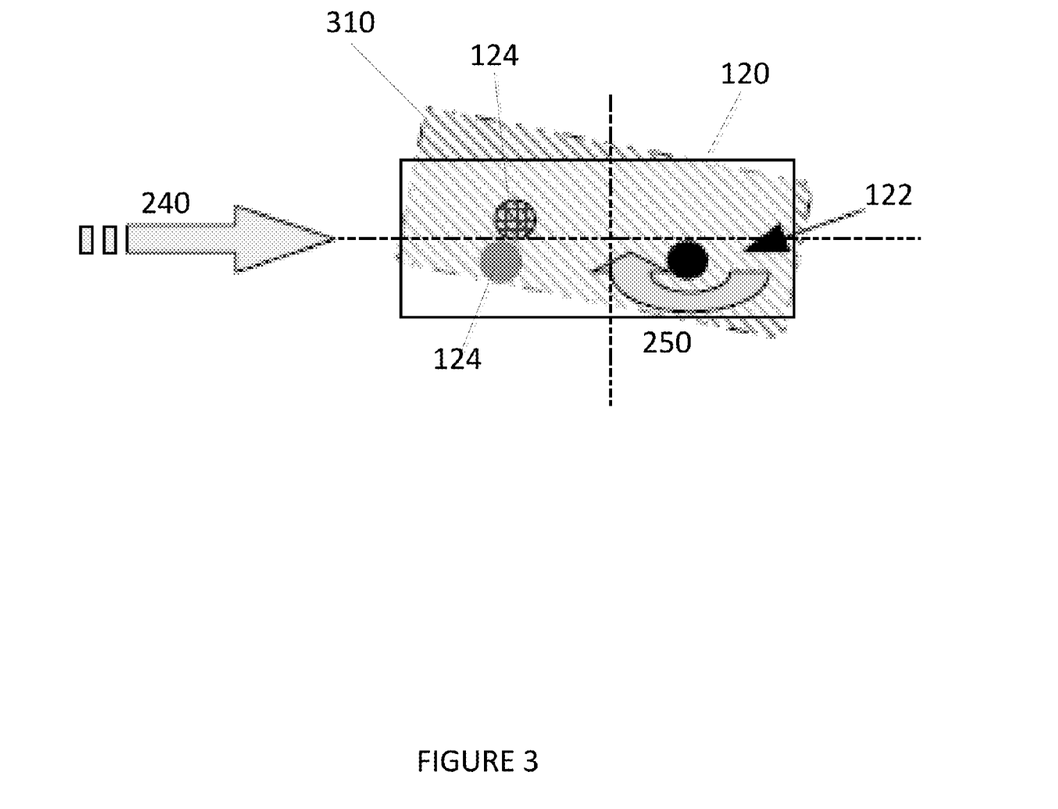
FIG. 3 depicts a top view of a carriage receiving a force, according to an embodiment.

FIG. 3 depicts a top view of carriage 120 receiving force 240, according to an embodiment. As depicted in FIG. 3, responsive to force 240 being applied to carriage 120, carriage 120 may move in a circular direction 250 around first fulcrum 122.

When rotating around first fulcrum 122, carriage 120 may move up the inclined ramp 110 to be positioned in a new position 310. In new position 310, a first corner of carriage 120 may be positioned ahead of its previous position, and a second corner of carriage 120 may be positioned behind its previous position. Next, as depicted in FIGS. 4 and 5, carriage 120 may receive force in a different direction to move the second corner forward utilizing portions of the weight of carriage 120 to lift carriage 120 up the inclined ramp 110.

Figure 4:
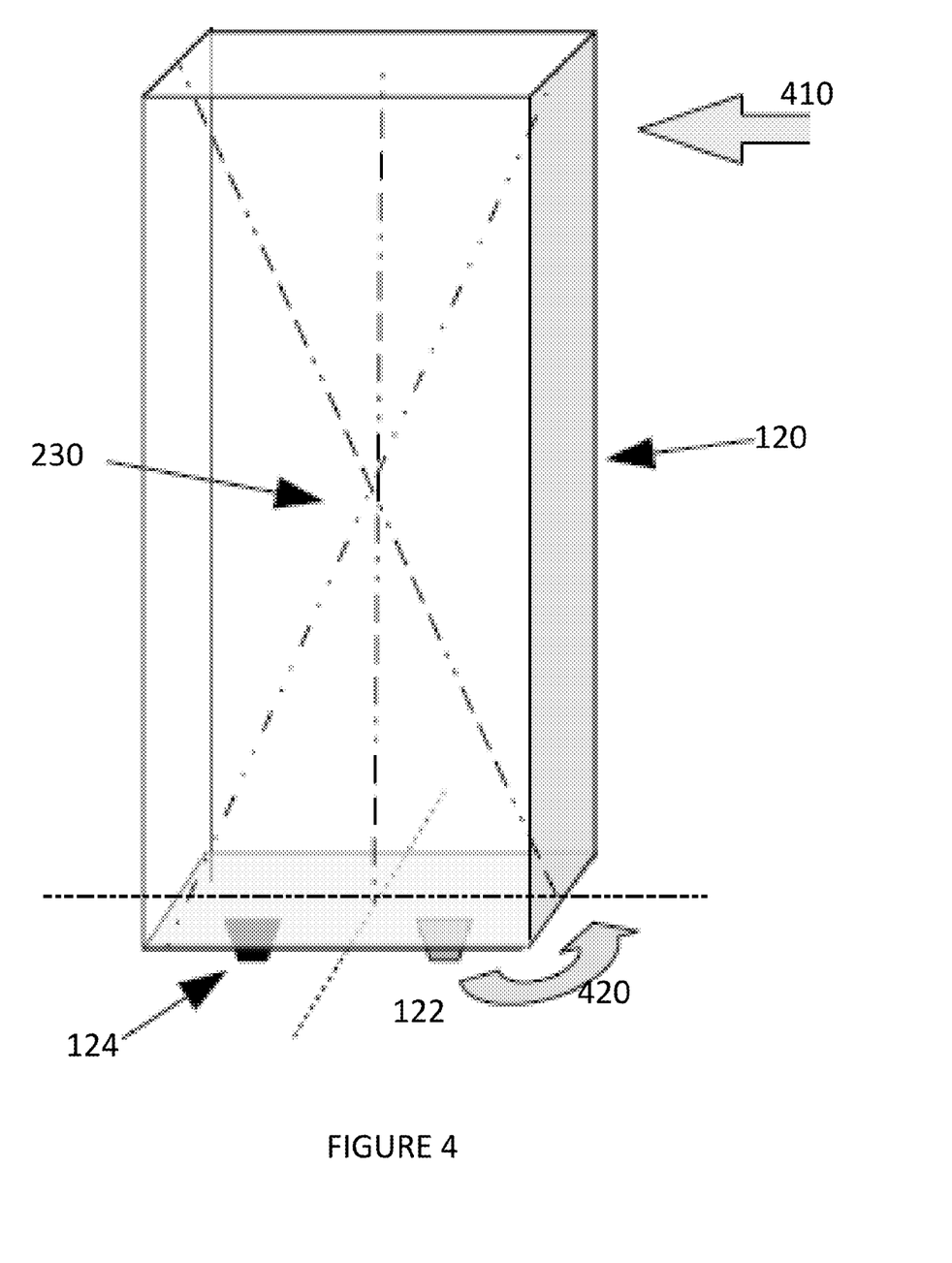
FIG. 4 depicts a force being applied to a carriage, according to an embodiment.

FIG. 4 depicts force 410 being applied to carriage 120, according to an embodiment. As force 410 is applied to carriage 120, carriage 120 may pivot around second fulcrum 124, wherein second fulcrum 124 is positioned on an opposite side of carriage 120 that is receiving force 410.

Upon receiving the force 410, carriage 120 may rotate in a second circular direction 420, wherein the second circular direction is an opposite rotational direction as the first circular direction. When being rotated, first fulcrum 122 may be raised off an inclined ramp 110 and moved upward along the inclined ramp 110.

Figure 5:
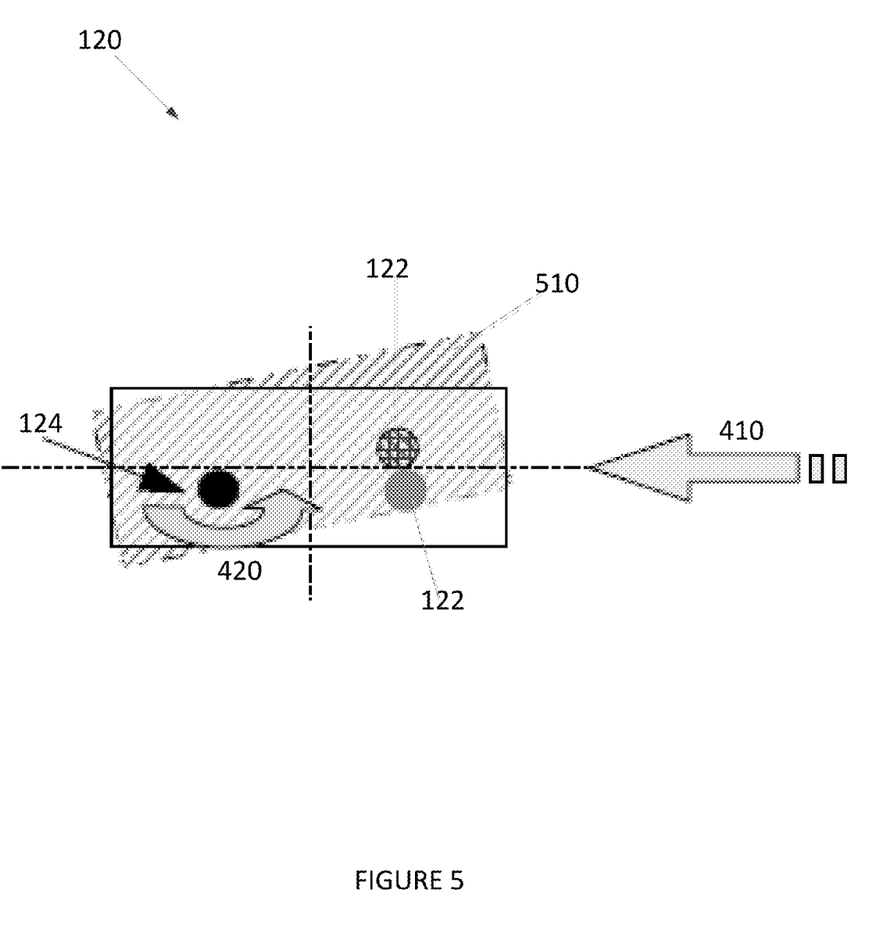
FIG. 5 depicts a top view of a carriage receiving a force, according to an embodiment.

FIG. 5 depicts a top view of carriage 120 receiving force 410, according to an embodiment. As depicted in FIG. 5, responsive to force 410 being applied to carriage 120, carriage 120 may move in a circular direction 420 around second fulcrum 124.

When rotating around second fulcrum 124, carriage 120 may move up the inclined plane to be positioned in a new position 510. In new position 510, a second corner of carriage 120 may be positioned ahead of its previous position, and a first corner of carriage 120 may be positioned behind its previous position. By applying forces in different directions to move carriage 120 the force may utilize the size, shape and weight of carriage 120 to lift carriage 120 up the inclined ramp. Accordingly, by varying the center of gravity of carriage 120 while carriage 120 is moving up the inclined ramp, portions of carriage 120 positioned on a first side of the center of gravity may counter balance portions of carriage 120 positioned on a second side of the center of gravity.

Figure 6:
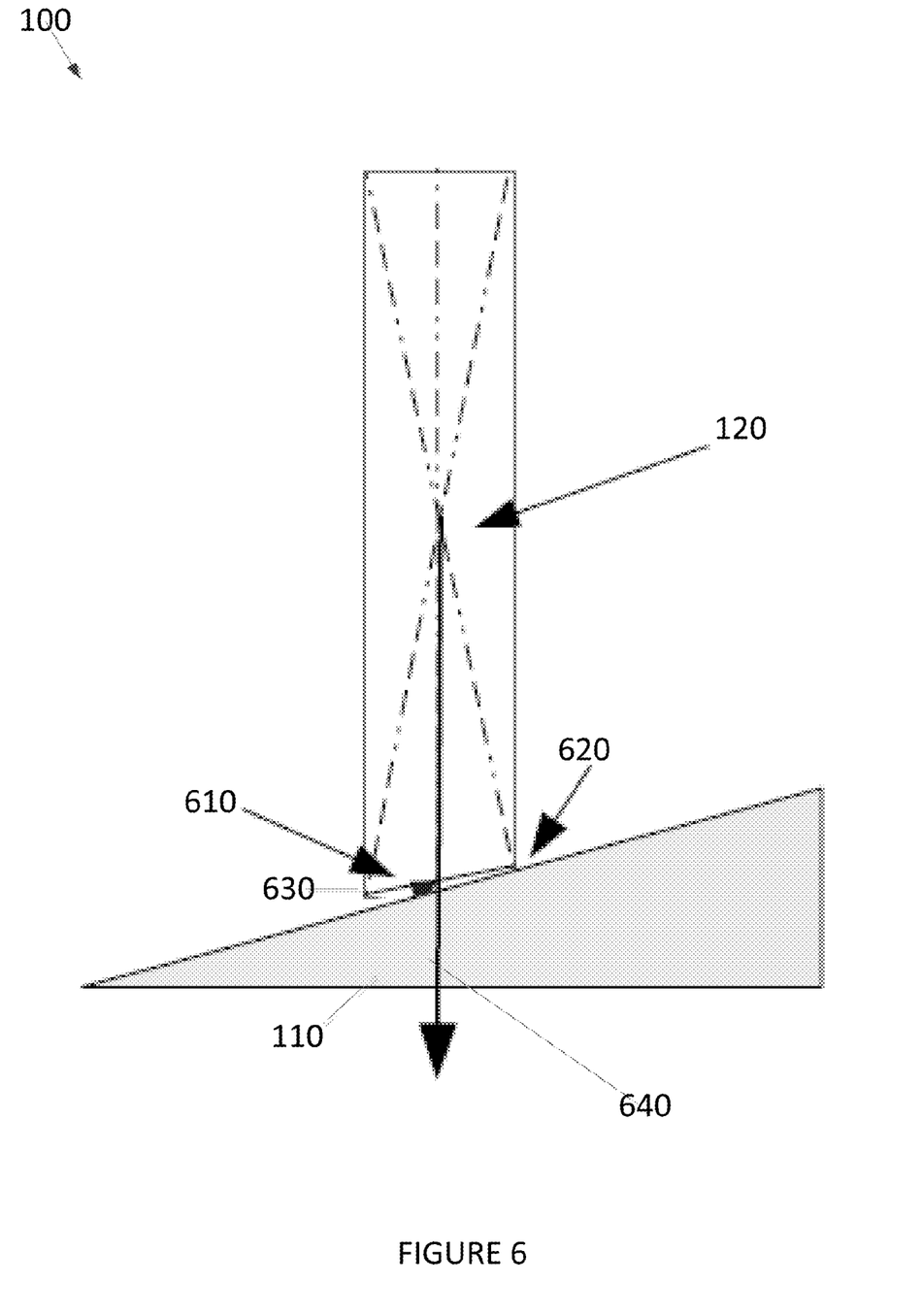
FIG. 6 depicts a lifting system, according to an embodiment.

FIG. 6 depicts lifting system 100, according to an embodiment. As depicted in FIG. 6 the base of carriage 120 may be shaped so as to not interfere with its free movement along the inclined ramp. Elements depicted in FIG. 6 may be described above, and for the sake of brevity a further description of these elements is omitted.

As depicted in FIG. 6, carriage 120 may include a plurality of fulcrums 630, wherein the fulcrums 630 are positioned on a first end 610 of carriage 120. The first end of carriage 120 may be vertically positioned below a second end 630 of carriage. Due to fulcrums 630 projecting away from a lower surface of carriage 120, fulcrums 630 may be positioned adjacent to the inclined ramp 110 while the second end 620 of carriage 120 is also positioned adjacent to the inclined ramp. Furthermore, due to fulcrums 630 projecting away from carriage 120 the center of gravity 640 of carriage 120 may be perpendicular to a short axis of carriage 120 and in parallel to a long axis of carriage 120.

Additionally, as depicted in FIG. 6, a lower surface of carriage 120 may be positioned at a first angle. In embodiments, the first angle may have less than the angle of the inclined ramp 120, wherein both the first angle and the angle of the inclined ramp 120 are negative angles. As such, first end 610 of carriage 120 may be positioned away from the surface of the inclined ramp 110, while the second end 620 of carriage 120 is positioned adjacent to the surface of the inclined ramp 110.

More so, lower surfaces of fulcrums 630 may have an angle that is substantially the same as that of the angle of the inclined ramp 120. This may assist in the stability of movement of carriage 120 up the inclined ramp.

Figure 7:
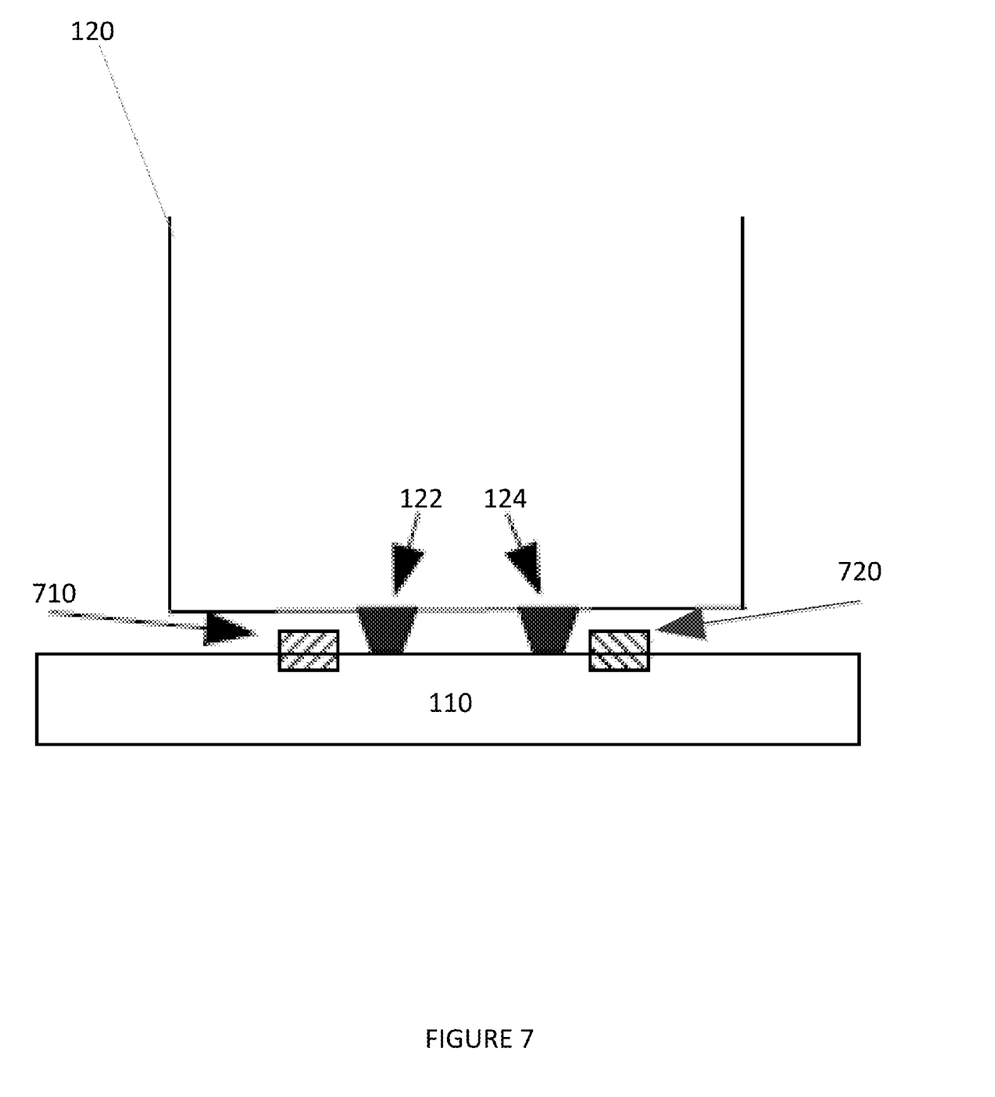
FIG. 7 depicts elements of a lifting system, according to an embodiment.

FIG. 7 depicts elements of lifting system 100, according to an embodiment. Elements depicted in FIG. 7 may be described above, and for the sake of brevity a further description of these elements is omitted.

As depicted in FIG. 7, inclined ramp 110 may include guides 710, 720. The guides 710, 720 may be positioned on the outsides of fulcrums 122 and 124, wherein guides 710, 720 may be configured to facilitate the placement and positioning of fulcrums 122 and 124 as carriage 120 moves up and along the incline ramp 110. Furthermore, guides 710, 720 may be configured to limit or prevent unwanted drag of carriage 120 while carriage 120 is tilting and pivoting. As it may be understood, the guides are not to be limited to a straight linear structure upon the incline. The guides may be designed in any manner and placed beneath the carriage in any location which may facilitate the placement of the carriage along the incline.

In embodiments, the height of guides 710, 720 may be less than the heights of fulcrums 122, 124.

Figure 8:
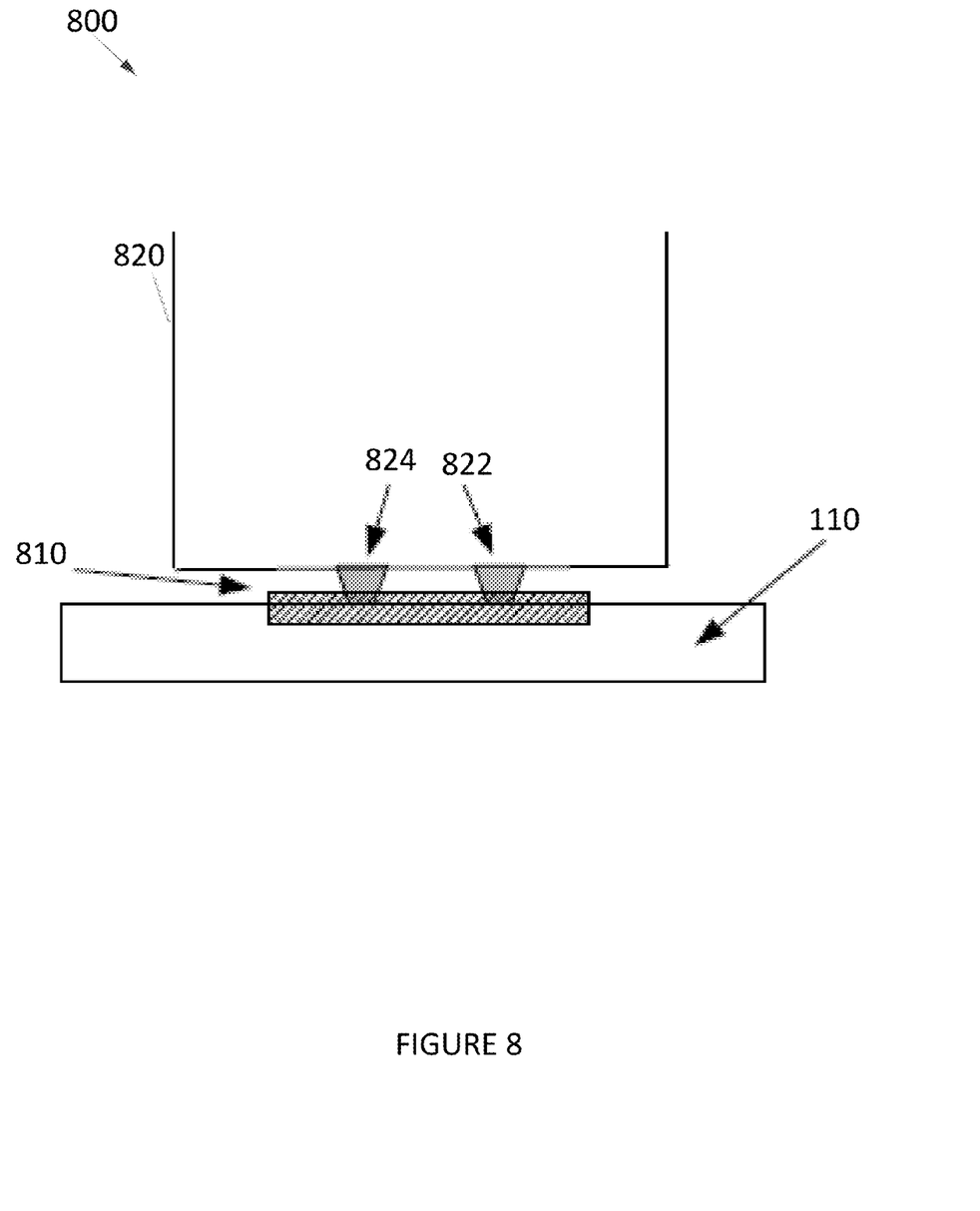
FIG. 8-12 depict fulcrum guides for a lifting system, according to embodiments.
Figure 9:
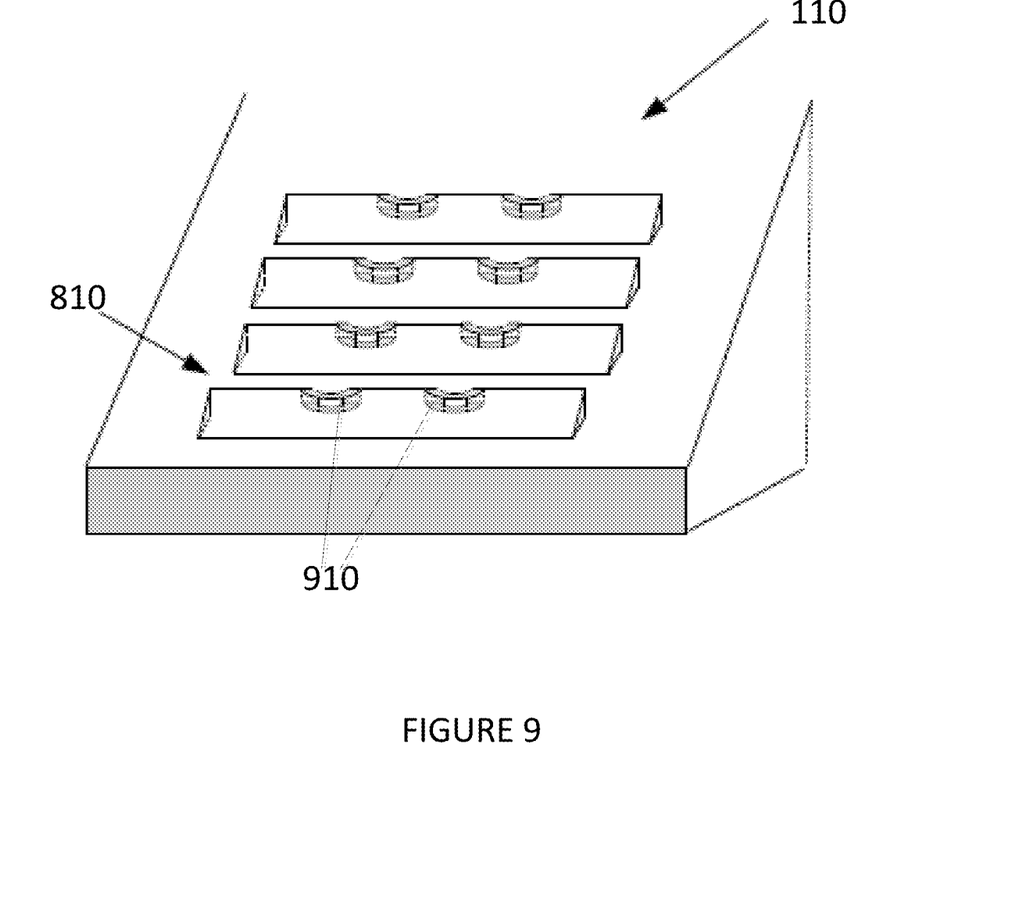

FIGS. 8 and 9 depict elements of lifting system 800, according to an embodiment. Elements depicted in FIGS. 8-9 may be described above, and for the sake of brevity a further description of these elements is omitted.

As depicted in FIG. 8, carriage 820 may include fulcrums 822, 824 that are aligned with fulcrum guide 810. Fulcrum guide 810 may extend across fulcrums 822, 824, and may be positioned such that a lower surface of fulcrums 822, 824 are positioned within fulcrum guide 810, and an upper surface of fulcrums 822, 824 are positioned outside of fulcrum guide.

As depicted in FIG. 9, an inclined plane 110 may have a plurality of fulcrum guides 810. Each fulcrum guide 810 may be angled at substantially the same angle as the inclined plane, and may include multiple supports 910. Each support 910 may be configured to receive a fulcrum 822, 824, while carriage 820 is moved up the inclined plane. The supports 910 may include concave indentations to support carriage 820 as a fulcrum is being used as a pivot.

Figure 10:
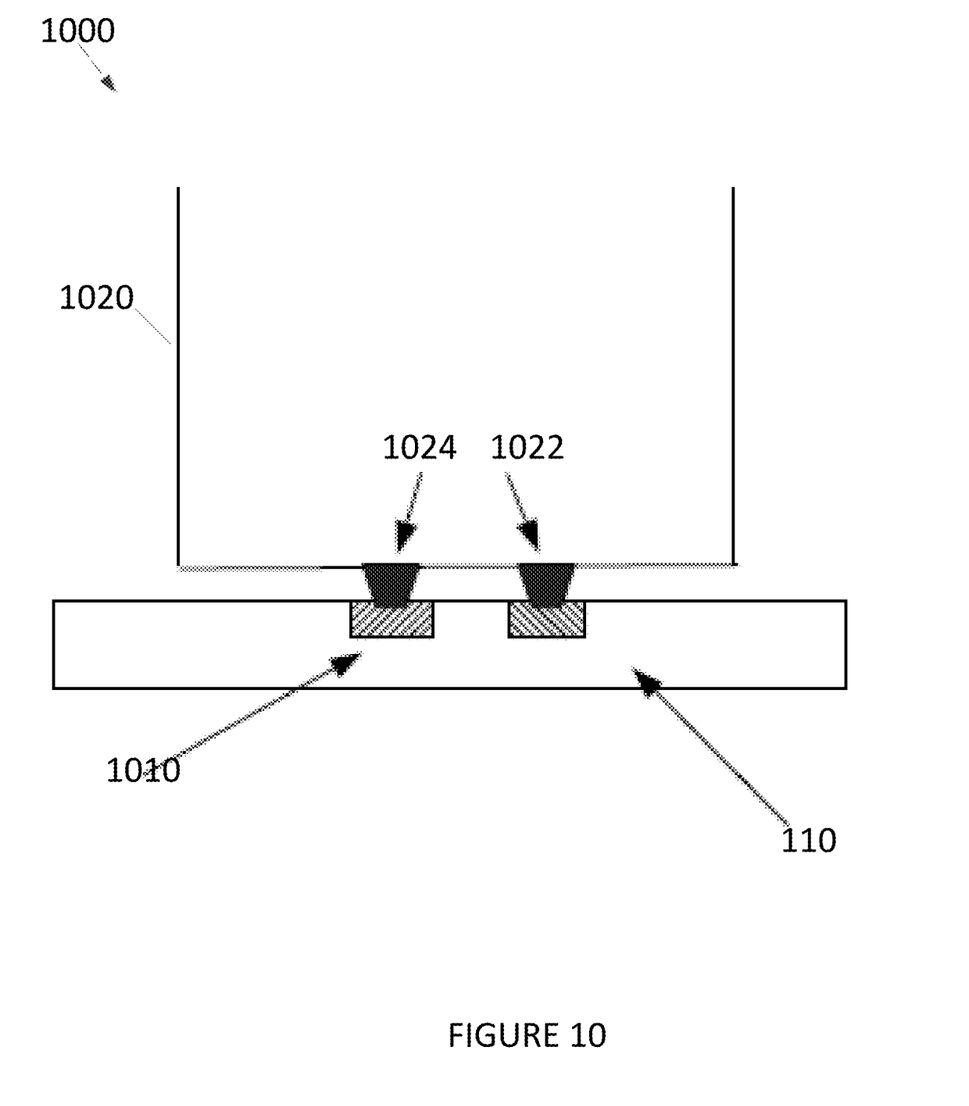
Figure 11:
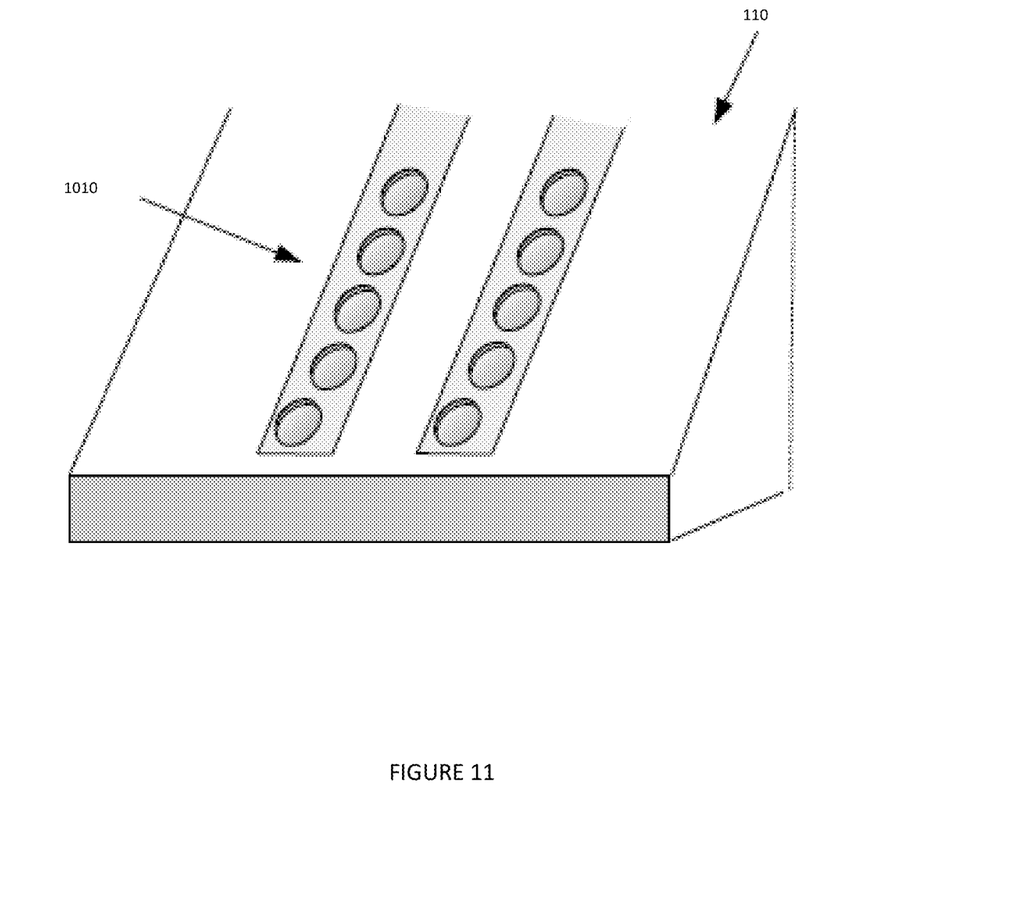

FIGS. 10 and 11 depict elements of lifting system 1000, according to an embodiment. Elements depicted in FIGS. 10-11 may be described above, and for the sake of brevity a further description of these elements is omitted.

As depicted in FIG. 10, carriage 1020 may include fulcrums 1022, 1024 that are aligned with fulcrum guides 1010. Fulcrum guides 1010 may be configured to interface with a single corresponding fulcrum 1022 or 1024.

As depicted in FIG. 11, fulcrum guides 1010 in a first column may be horizontally and vertically offset from the distance from fulcrum guides 1010 in the first column and in a second column. As such, fulcrum guides 1010 may be utilized to support movement of a carriage up inclined ramp 110.

Figure 12:
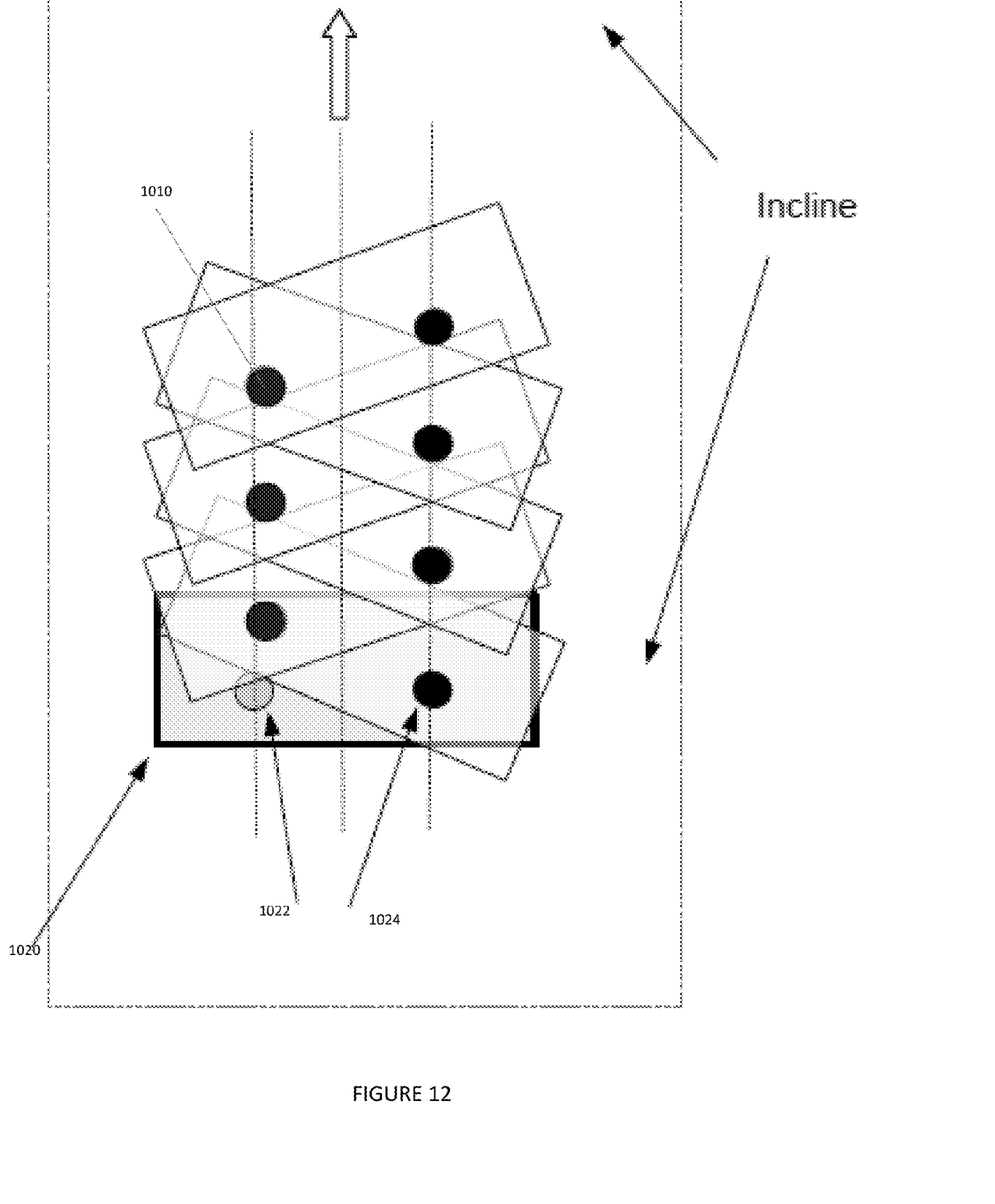

FIG. 12 depicts an embodiment of carriage 1020 moving up an inclined plane 110 with fulcrum guides 1010. As depicted in FIG. 12, carriage 1020 may be rotated and tilted to change the pivot point of carriage 1020 between fulcrums 1022 and 1024.

Reference throughout this specification to "one embodiment," "an embodiment" "one example," or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A lifting system comprising:
   an inclined ramp including a first end and a second end forming an incline, the first end being below the second end, wherein an angled surface is between the first end and the second end, the angled surface including fulcrum interfaces;
   a carriage including a first fulcrum and a second fulcrum positioned on a lower surface of the carriage, the first fulcrum and the second fulcrum being positioned more proximate to a first edge of the carriage than a second edge of the carriage, wherein the first fulcrum and the second fulcrum are configured to interface with the fulcrum interfaces to pivot, tilt, and rotate the carriage.

2. The lifting system of claim 1, wherein the lower surface of the carriage is angled from the first edge to the second edge, wherein the angle of the lower surface of the carriage is shaped to allow for a non-restricted movement up the inclined.

3. The lifting system of claim 2, wherein bottom surfaces of the first fulcrum and the second fulcrum are shaped to ensure secure and accurate placement upon the incline and within a guide along the surface of the incline.

4. The lifting system of claim 1, wherein when the carriage receives force in a first direction the carriage tilts and rotates in a first circular motion and pivots on the first fulcrum.

5. The lifting system of claim 4, wherein when the carriage receives force in a second direction the carriage tilts and rotates in a second circular motion and pivots on the second fulcrum.

6. The system of claim 5, wherein rotating the carriage in the first circular motion or the second circular motion permits the carriage to respond to its unbalanced position on one of the first fulcrum or the second fulcrum, wherein a change of a center of gravity assists in moving the carriage up the inclined ramp.

7. The system of claim 6, wherein the change of center of gravity in the carriage causes portions of the carriage on a first side of the center of gravity to counter balance portions of the carriage on a second side of the center of gravity.

8. The system of claim 1, wherein the fulcrum interfaces are guides extending from the first end of the inclined ramp to the second end of the inclined ramp.

9. The system of claim 8, wherein the guides are positioned to guide the placement of first fulcrum and the second fulcrum.

10. The system of claim 9, wherein the guides receive and support fulcrum placement.

* * * * *